US012670724B2

(12) United States Patent
Chemali et al.

(10) Patent No.: US 12,670,724 B2
(45) Date of Patent: Jun. 30, 2026

(54) GENERATING TRAINING DATA FOR ADAS USING NEURAL NETWORK

(71) Applicant: Atieva, Inc., Newark, CA (US)

(72) Inventors: Ephram Chemali, Fremont, CA (US); Anish Kachinthaya, Dublin, CA (US)

(73) Assignee: Atieva, Inc., Newark, CA (US)

( * ) Notice: Subject to any disclaimer, the term of this patent is extended or adjusted under 35 U.S.C. 154(b) by 369 days.

(21) Appl. No.: 18/329,247

(22) Filed: Jun. 5, 2023

(65) Prior Publication Data

US 2024/0395049 A1 Nov. 28, 2024

Related U.S. Application Data

(60) Provisional application No. 63/504,042, filed on May 24, 2023.

(51) Int. Cl.
*G06V 20/58* (2022.01)
*B60W 60/00* (2020.01)
(Continued)

(52) U.S. Cl.
CPC .......... *G06V 20/58* (2022.01); *B60W 60/001* (2020.02); *G01S 17/42* (2013.01); *G01S 17/86* (2020.01); *G01S 17/931* (2020.01); *G06V 10/761* (2022.01); *G06V 10/774* (2022.01); *G06V 10/82* (2022.01); *B60W 2420/40* (2013.01);
(Continued)

(58) Field of Classification Search
None
See application file for complete search history.

(56) References Cited

U.S. PATENT DOCUMENTS

| 2018/0373980 A1 | 12/2018 | Huval |
| 2020/0174132 A1 | 6/2020 | Nezhadarya et al. |

(Continued)

FOREIGN PATENT DOCUMENTS

| WO | WO-2022019932 A1 * | 1/2022 | .......... H04L 63/062 |
| WO | 2023076903 A1 | 5/2023 | |

OTHER PUBLICATIONS

International Search Report and Written Opinion for PCT Application No. PCT/US2024/030381, mailed on Sep. 13, 2024, 12 pages.
(Continued)

*Primary Examiner* — Thomas D Lee
(74) *Attorney, Agent, or Firm* — Brake Hughes Bellermann LLP

(57) ABSTRACT

A computer-implemented method comprises: receiving camera images and three dimensional (3D) data captured by a first vehicle during travel; obtaining, by providing the camera images to a two-dimensional (2D) object detection algorithm, 2D bounding boxes corresponding to first objects visible in the camera images; obtaining 3D bounding boxes corresponding to second objects in the 3D data; performing association of the 2D bounding boxes with corresponding ones of the 3D bounding boxes using a first neural network; and generating, using the camera images and the 2D bounding boxes associated with corresponding ones of the 3D bounding boxes, training data for training a second neural network to perform 2D and 3D object detection in an advanced driver assistance system (ADAS) for a second vehicle.

20 Claims, 7 Drawing Sheets

(51) Int. Cl.

| | |
|---|---|
| *G01S 17/42* | (2006.01) |
| *G01S 17/86* | (2020.01) |
| *G01S 17/931* | (2020.01) |
| *G06V 10/74* | (2022.01) |
| *G06V 10/774* | (2022.01) |
| *G06V 10/82* | (2022.01) |
| G06V 10/764 | (2022.01) |

(52) U.S. Cl.
CPC .................. *B60W 2420/408* (2024.01); *B60W 2554/4029* (2020.02); *G06V 10/764* (2022.01)

(56) References Cited

U.S. PATENT DOCUMENTS

| | | |
|---|---|---|
| 2021/0012166 A1 | 1/2021 | Braley et al. |
| 2021/0073626 A1 | 3/2021 | Brahma et al. |
| 2022/0027675 A1* | 1/2022 | Sheu .................... G01S 17/931 |

OTHER PUBLICATIONS

Yan et al., "Correlations Between Deep Neural Network Model Coverage Criteria and Model Quality", ESEC/FSE 2020: Proceedings of the 28th ACM Joint Meeting on European Software Engineering Conference and Symposium on the Foundations of Software Engineering; Nov. 13, 2020, 13 pages, <https://people.cs.rutgers.edu/~jz798/papers/fse20_yan.pdf>.

* cited by examiner

300

306    304

302

310    308

305

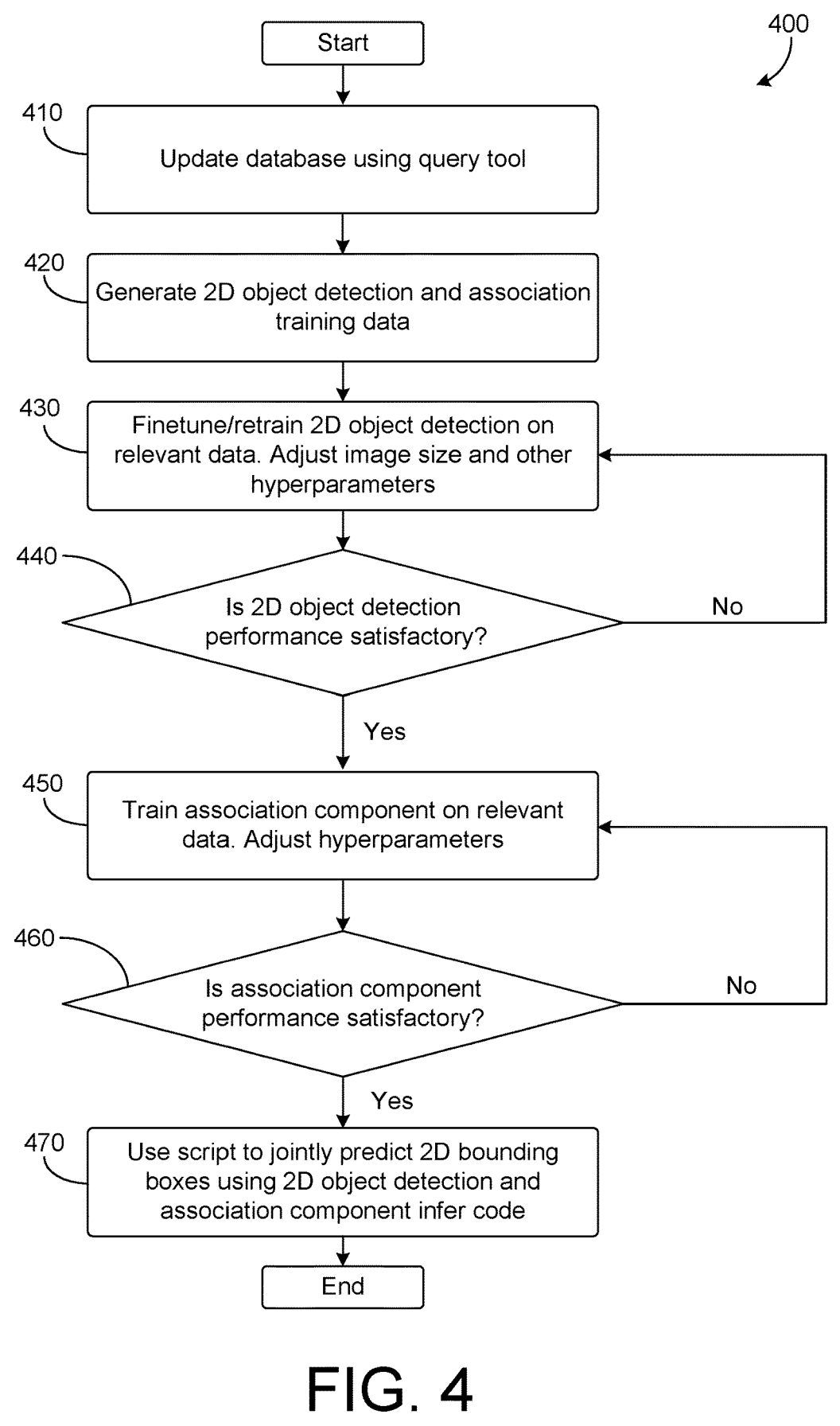

400

Start

410 — Update database using query tool

420 — Generate 2D object detection and association training data

430 — Finetune/retrain 2D object detection on relevant data. Adjust image size and other hyperparameters 440 — Is 2D object detection performance satisfactory?          No Yes 450 — Train association component on relevant data. Adjust hyperparameters 460 — Is association component performance satisfactory?          No Yes 470 — Use script to jointly predict 2D bounding boxes using 2D object detection and association component infer code End

FIG. 4

GENERATING TRAINING DATA FOR ADAS USING NEURAL NETWORK

CROSS-REFERENCE TO RELATED APPLICATION

This application claims benefit, under 35 U.S.C. § 119, of U.S. Provisional Patent Application No. 63/504,042, filed on May 24, 2023, entitled "GENERATING TRAINING DATA FOR ADAS USING NEURAL NETWORK", the disclosure of which is incorporated by reference herein in its entirety.

TECHNICAL FIELD

This document relates to generating training data for an advanced driver assistance system (ADAS) using a neural network.

BACKGROUND

Some vehicles manufactured nowadays are equipped with one or more types of systems that can at least in part handle operations relating to the driving of the vehicle. Some such assistance involves automatically surveying surroundings of the vehicle and being able to take action regarding detected vehicles, pedestrians, or objects. The performance of such assistance systems depends on them being trained to perform their expected tasks.

SUMMARY

In a first aspect, a computer-implemented method comprises: receiving camera images and three dimensional (3D) data captured by a first vehicle during travel; obtaining, by providing the camera images to a two-dimensional (2D) object detection algorithm, 2D bounding boxes corresponding to first objects visible in the camera images; obtaining 3D bounding boxes corresponding to second objects in the 3D data; performing association of the 2D bounding boxes with corresponding ones of the 3D bounding boxes using a first neural network; and generating, using the camera images and the 2D bounding boxes associated with corresponding ones of the 3D bounding boxes, training data for training a second neural network to perform 2D and 3D object detection in an advanced driver assistance system (ADAS) for a second vehicle.

Implementations can include any or all of the following features. The computer-implemented method further comprises training the second neural network using the training data. The 3D data comprises point cloud data reflecting surroundings of the first vehicle during the travel. The point cloud data is received from a light detection and ranging (LiDAR) device of the first vehicle. The 2D bounding boxes include pixel coordinates regarding the first objects visible in the camera images. The 2D object detection algorithm is performed by a third neural network. The computer-implemented method further comprises training the third neural network, before providing the camera images to the 2D object detection algorithm, the third neural network trained using previous camera images associated with previous 2D bounding boxes. The 3D bounding boxes include 3D coordinates and heading angles for the second objects in the 3D data. The 3D bounding boxes are generated by a person who identifies the second objects based on analyzing the 3D data. The 2D object detection algorithm also performs classification of the first objects visible in the camera images, and wherein the training data further includes classification information. The first neural network performs the association of the 2D bounding boxes with the 3D bounding boxes using a similarity measure. Performing the association of the 2D bounding boxes with the 3D bounding boxes comprises: performing a first cropping of the camera images based on the 2D bounding boxes; performing a second cropping of the camera images based on the 3D bounding boxes; and evaluating the first and second croppings using the similarity measure. Performing the second cropping comprises using a translation parameter between a camera and a light detection and ranging (LiDAR) device of the first vehicle. The first neural network uses a first feature vector that is based on the camera images, and a second feature vector that is a representation of the 3D data. The first neural network performs the association by determining a loss associated with the first and second vectors.

In a second aspect, a computer system comprises: a two-dimensional (2D) object detection algorithm implemented using at least a first processor and a first memory, the 2D object detection configured to create 2D bounding boxes corresponding to first objects visible in a camera images captured by a first vehicle during travel; and a first neural network implemented using at least a second processor and a second memory, the first neural network configured to associate the 2D bounding boxes with corresponding ones of 3D bounding boxes corresponding to second objects in 3D data captured by the first vehicle during the travel, wherein the computer system generates, using the camera images and the 2D bounding boxes associated with corresponding ones of the 3D bounding boxes, training data for training a second neural network to perform 2D and 3D object detection in an advanced driver assistance system (ADAS) for a second vehicle.

Implementations can include any or all of the following features. The computer system further comprises a third neural network that is configured to perform the 2D object detection algorithm. The first neural network is configured to perform the association of the 2D bounding boxes with the 3D bounding boxes using a similarity measure. The first neural network is configured to perform the association using a first feature vector that is based on the camera images, and a second feature vector that is a representation of the 3D data.

In a third aspect, a non-transitory computer readable medium stores instructions that when executed by at least one processor cause operations to be performed, the operations comprising: receiving camera images and three dimensional (3D) data captured by a first vehicle during travel; obtaining, by providing the camera images to a two-dimensional (2D) object detection algorithm, 2D bounding boxes corresponding to first objects visible in the camera images; obtaining 3D bounding boxes corresponding to second objects in the 3D data; performing association of the 2D bounding boxes with corresponding ones of the 3D bounding boxes using a first neural network; and generating, using the camera images and the 2D bounding boxes associated with corresponding ones of the 3D bounding boxes, training data for training a second neural network to perform 2D and 3D object detection in an advanced driver assistance system (ADAS) for a second vehicle.

BRIEF DESCRIPTION OF DRAWINGS

FIG. 4 shows a flowchart of an example of a process of generating training data for an ADAS.

Like reference symbols in the various drawings indicate like elements.

DETAILED DESCRIPTION

Figure 1:
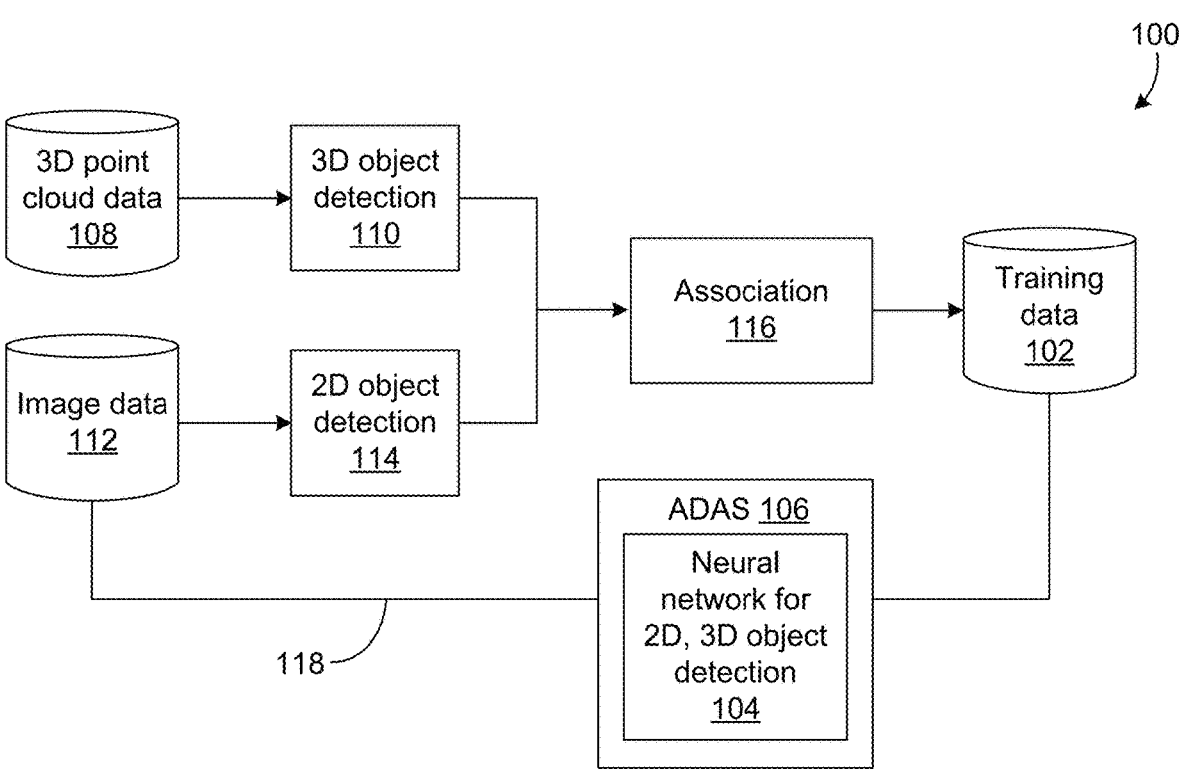
FIG. 1 shows an example of a system that can generate training data for training a neural network of an ADAS for a vehicle.

This document describes examples of computer-implemented systems and techniques that use a neural network in generating training data for a neural network of an ADAS. The processing can involve defining two-dimensional (2D) bounding boxes for camera images, and three-dimensional (3D) bounding boxes for 3D data, and associating the 2D and 3D bounding boxes with each other. In some implementations, a pipeline can be developed to take as input only 3D labels based on a 360-degree light detection and ranging (LiDAR) point cloud and output auto-labels for 2D bounding boxes on the images. The 3D labels can be defined in any of multiple ways, including but not limited to, by a person who identifies objects based on analyzing the 3D data. In some implementations, a 2D detection algorithm (e.g., a first neural network) can be used in combination with a second neural network to associate the 2D outputs from the 2D detection algorithm to the 3D labels. This can generate training data for configuring an ADAS (e.g., for training a third neural network of the ADAS to perform camera-based object detection and classification).

In previous approaches of generating training data for a monocular (camera-based) 2D-3D object detection algorithm, human labellers have been used for annotating every object on the image (2D bounding box) and the associated 3D bounding box based on the associated LiDAR point cloud. The present subject matter can generate training data at significantly less cost and/or faster.

The present subject matter relates to ADASs that use computer-based models to predict 3D and 2D locations of objects. 3D locations can be defined relative to the ego vehicle (i.e., relative to a vehicle coordinate system), and 2D locations can be defined relative to the camera image (e.g., in terms of pixel coordinates, such as in rows and columns of the camera image). The object detection can take one or more images from the camera(s) of the vehicles and predict the 3D and 2D information about objects visible in the image(s). The 3D bounding boxes can be referred to as 3D cuboids and can include information such as width, length and height, and heading angle. The present subject matter can automatically create 2D labels that are to be used in training the neural network of the ADAS.

In some implementations, the present subject matter involves the development of an ADAS having an algorithm (e.g., a neural network) that is to analyze images from a vehicle camera and detect objects in them. The present subject matter can use a first neural network for automatically performing the 2D labeling, use a second neural network for associating the 2D bounding boxes with 3D bounding boxes regarding the same detected object(s), generate training data using the camera images and the 2D and 3D bounding boxes associated with each other, and train a third neural network with the training data.

Examples described herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples described herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples described herein refer to an ADAS. Assisted driving involves at least partially automating one or more dynamic driving tasks by way of computer-based operations (e.g., by a processor executing instructions). An ADAS can perform assisted driving and is an example of an assisted-driving system. Assisted driving is performed based in part on the output of one or more sensors typically positioned on, under, or within the vehicle, which is sometimes referred to as the ego vehicle. An ADAS can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples described herein refer to a LiDAR. As used herein, a LiDAR includes any object detection system that is based at least in part on light, wherein the system emits the light in one or more directions. The light can be generated by a laser and/or by a light-emitting diode (LED), to name just two examples. The LiDAR can emit light pulses in different directions (e.g., characterized by different polar angles and/or different azimuthal angles) so as to survey the surroundings. For example, one or more laser beams can be impinged on an orientable reflector for aiming of the laser pulses. The LiDAR can detect the return signals by a suitable sensor to generate an output. A scanning lidar or a non-mechanical scanning LiDAR can be used, to name just two examples.

Examples described herein refer to a neural network. A neural network can operate based on one or more neural network models. As used herein, a neural network model is a machine-learning tool implemented in form of processing nodes (sometimes referred to as artificial neurons) defined to receive one or more inputs (e.g., from sensor output and/or from another processing node), and to use the input(s) to generate an output (e.g., to another processing node or as a final output of the neural network model.

Examples described herein refer to training data for training a neural network. As used herein, "training" refers to any aspect of developing, configuring, adjusting, optimizing, or updating a neural network. Training data can provide examples to be processed during a learning procedure. During the learning, the artificial neurons in the various layers of the neural network receive inputs that are based on the training data, the inputs weighted relative to each other for each neuron. The neuron then applies a nonlinear function to the weighted inputs to generate an output. The output that the neural network generates by processing the training data may or may not be identical to a target output of the training data. The neural network can adjust any or all of the weights based on one or more differences between the generated output and the target output.

FIG. 1 shows an example of a system 100 that can generate training data 102 for training a neural network 104 of an ADAS 106 for a vehicle. The system 100 or components thereof can be used with one or more other examples described elsewhere herein. Each component of the system 100 can be implemented using at least one processor and at least one memory. Instructions for computer-implemented functionality can be stored in a non-transitory computer readable medium to cause operations to be performed upon execution by at least one processor.

The neural network 104 (e.g., a neural network model included therein) can be trained for performing one or more driving tasks, including, but not limited to, object detection and/or lane detection. Such training can be performed using data collected with a camera and/or another sensor during vehicle travel conducted using one or more vehicles. Such vehicle(s) can be driven over shorter or longer distances to collect video data, camera still images, LiDAR point cloud data, radar echoes, and/or other vehicle sensor outputs. Such data can then be processed in one or more ways to prepare for the training of the neural network 104. In some implementations, images from the vehicle can be sent to vendors who specialize in performing labeling on the data to generate labelled data. The labelled data can include, but is not limited to, annotations of an image as containing a person, a car, and/or any other object. LiDAR point cloud data can be used to determine a relevant 3D position and define a bounding box around the detected object, to name just a few examples. The labelled data can be a diverse dataset that is reflective of myriad situations that may occur during driving.

Figure 2:
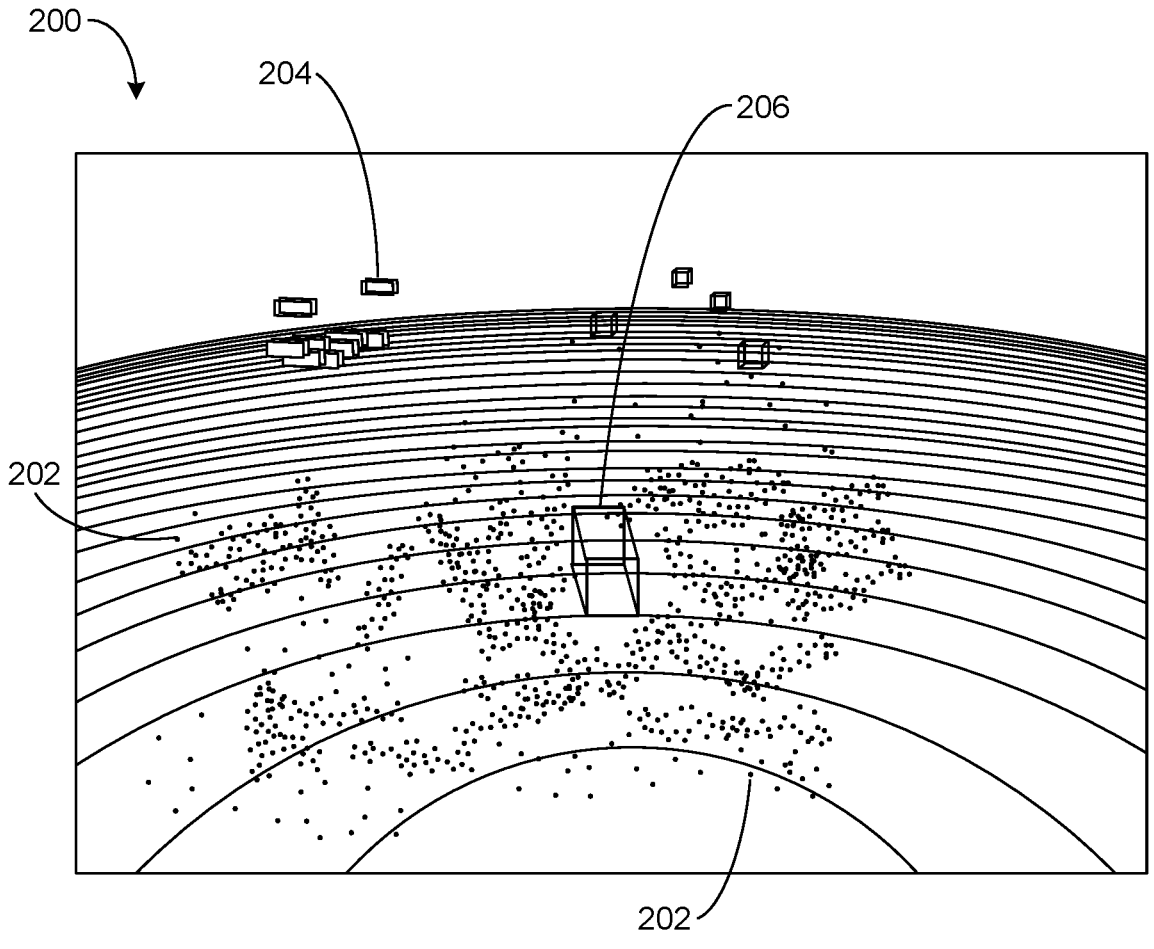
FIG. 2 shows an example of 3D data.

The system 100 can use 3D data 108. In some implementations, the 3D data 108 includes point cloud data collected during vehicle travel. For example, a LiDAR can generate the 3D data 108 (e.g., LiDAR point cloud data). FIG. 2 shows an example of 3D data 200 that illustrates what can be included in the 3D data 108. The 3D data 200 can be a LiDAR point cloud that includes numerous points 202 that correspond to echoes detected when laser light from the LiDAR is reflected by the surroundings of the ego vehicle.

The system 100 can include a 3D object detection component 110 that can receive the 3D data 108 and can detect one or more objects therein. In the 3D data 200, 3D bounding boxes 204 and 206 show examples of objects that have been detected. The 3D object detection component 110 can operate based on fully or semi-automated detection. In some implementations, a person can view the 3D data 200 (e.g., on a computer screen), analyze the 3D data 200, and identify one or more objects therein based on the points 202. For example, the person can define (e.g., draw) the bounding boxes 204 and/or 206 based on the analysis.

Figure 3A:
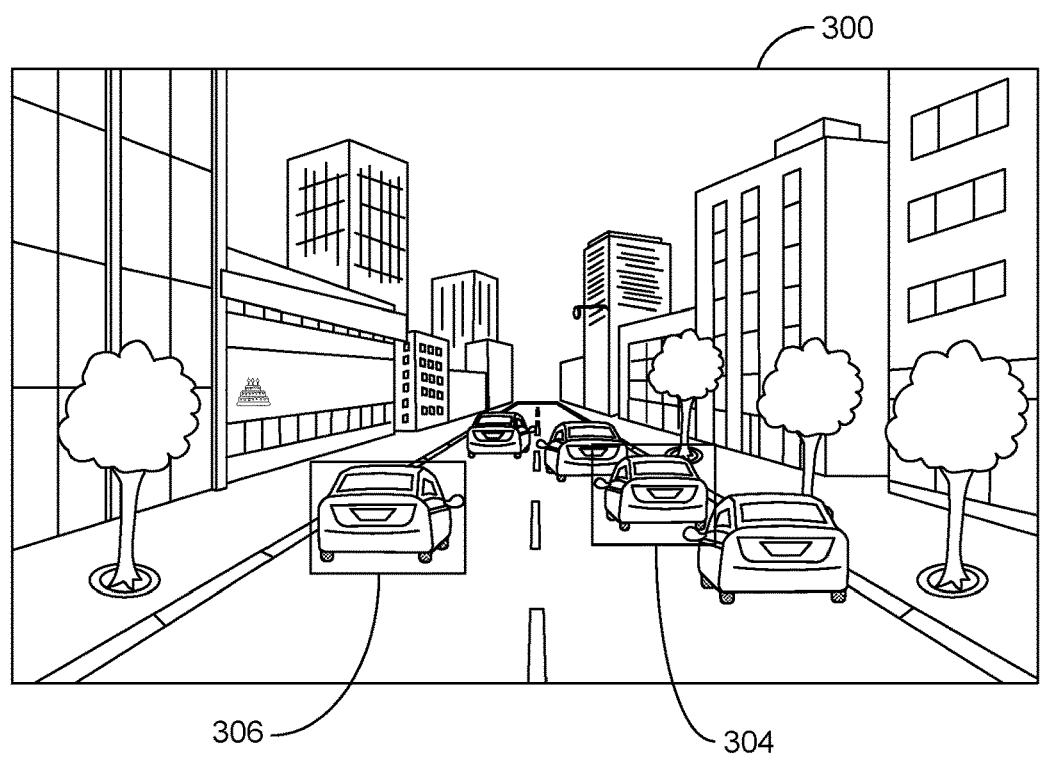
FIGS. 3A-3C show examples relating to processing involving two-dimensional data and three-dimensional data the present subject matter.
Figure 3B:
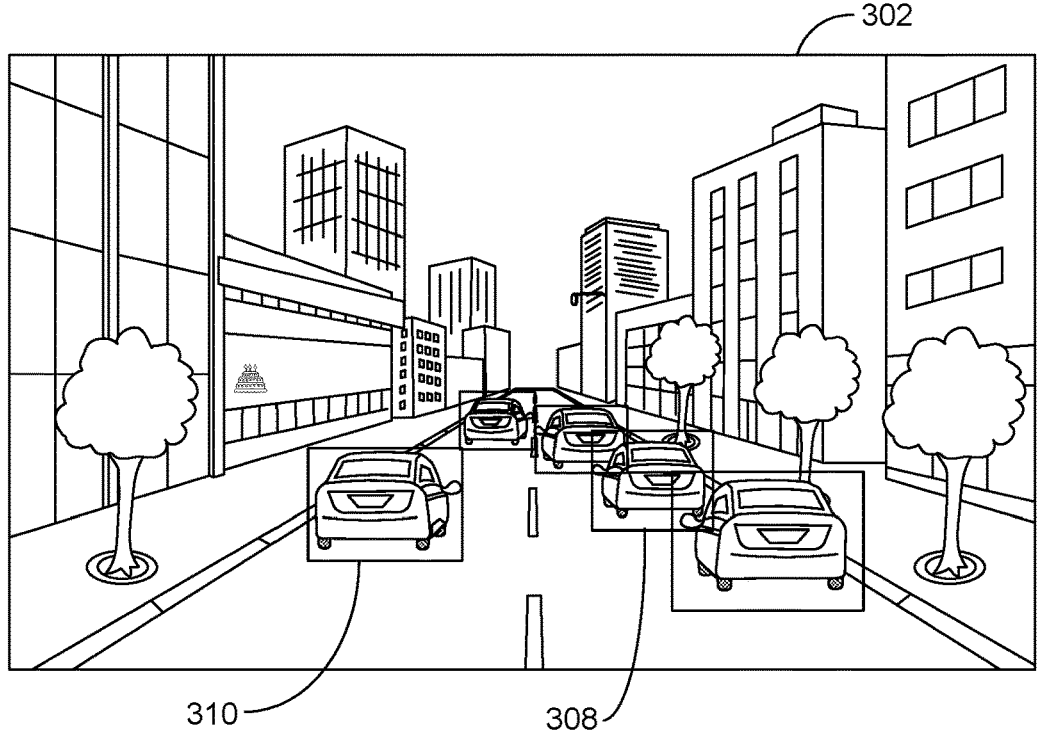
Figure 3C:
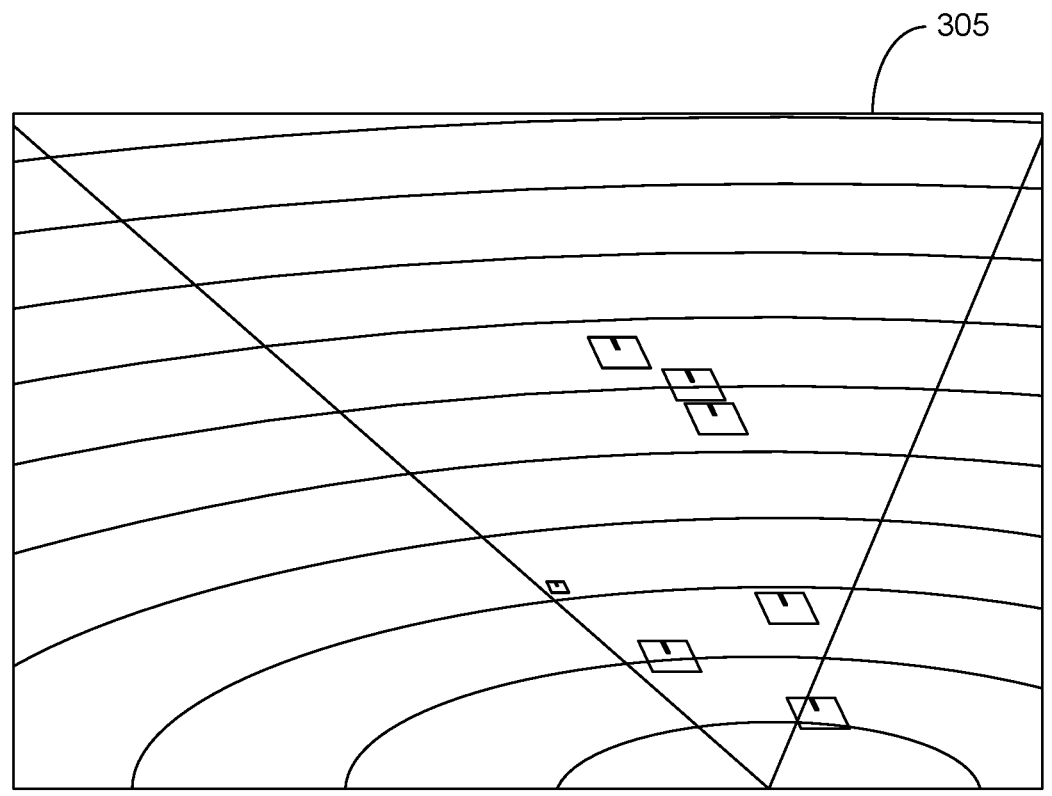

The system 100 can use image data 112. The image data 112 includes camera images captured using a camera mounted on a vehicle. This vehicle can be a different vehicle (e.g., a different type of vehicle) than the ego vehicle where the ADAS 106 is to be used. FIGS. 3A-3C show examples relating to processing involving 2D data and 3D data in the present subject matter; these examples involve camera images 300 and 302 that are annotated versions of the same camera image from the image data 112.

The system 100 can include a 2D object detection component 114 that can receive the image data 112 and can detect one or more objects therein. In the camera image 300, 2D bounding boxes 304 and 306 have been defined based on object detection. Each of the 2D bounding boxes 304-306 corresponds to a detected object (e.g., a respective vehicle in this example) and includes the corresponding pixel coordinates within the camera image 300 (e.g., row and column ranges or other values) where the respective objects are detected. The 2D object detection component 114 can include any 2D object detection algorithm. In some implementations, the 2D object detection component 114 includes a neural network configured for detecting objects in camera images and outputting their pixel coordinates and classification (e.g., whether the detected object is a car, truck, pedestrian or other object). For example, a publicly available neural network for 2D object detection can be trained to perform detection and classification of the kinds of objects that are expected to be encountered by the ego vehicle.

The 2D object detection component 114 generates an output that includes the 2D bounding boxes 304 and/or 306. The 3D object detection component 110, moreover, generates an output that includes 3D bounding boxes. 3D bounding boxes 308 and 310 are here shown in the camera image 302 for illustrative purposes and are defined based on information in the 3D data 108. For example, 3D data regarding the situation depicted in the camera images 300 and 302 is here presented in a bird's eye view 305 that shows the surroundings of the vehicle.

The system 100 includes a neural network 116 that receives the 2D and 3D bounding boxes generated by the 2D object detection component 114 and the 3D object detection component 110, respectively. The neural network 116 determines whether any of the 2D bounding boxes 304 or 306 is associated with any of the 3D bounding boxes 308 or 310.

Accordingly, the neural network 116 associates the 2D bounding box 304 with the 3D bounding box 308 based on them relating to the same detected object. Similarly, the neural network 116 associates the 2D bounding box 306 with the 3D bounding box 310 based on them relating to the same detected object. For example, the association between the bounding boxes is facilitated by synchronization between the 3D data 108 and the image data 112. A similarity measure can be used. For example, the neural network 116 can determine a similarity between the object identified by the 2D bounding box and the object identified by the 3D bounding box. If the objects are sufficiently similar according to a similarity standard, the neural network 116 can associate the respective 2D and 3D bounding boxes with each other.

The neural network 116 generates an output that includes at least the respective 2D and 3D bounding boxes associated with each other, and the corresponding portion(s) of the image data 112. The output can form the training data 102. For example, the training data 102 includes some or all camera images of the image data 112 annotated with 2D and 3D bounding boxes that are associated with each other accordingly. The neural network 104 of the ADAS 106 can then be trained using the training data 102. This can allow the neural network 104 to process input 118 of the image data 112 and perform object detection. The input 118 can represent the subsequent situation, after the neural network 104 has been trained, and the ADAS 106 is installed in a vehicle whose camera generates image data during travel.

FIG. 4 shows a flowchart of an example of a process 400 of generating training data for an ADAS. The process 400 can be used with one or more other examples described elsewhere herein. More or fewer operations than shown can be performed. Two or more operations can be performed in a different order unless otherwise indicated.

At operation 410, a database can be updated. In some implementations, the database is updated to include raw data captured during vehicle travel. For example, the raw data can include camera images and/or 3D data. The database can be updated by use of a query tool that allows for selection of data associated with one or more characteristics, including but not limited to daytime, nighttime, rainy weather, or snowy weather.

At operation 420, training data for 2D object detection and for an association component can be generated. The training data can be generated based on the update of the database in the operation 410. The 2D object detection can include the 2D object detection component 114.

At operation 430, 2D object detection can be finetuned and/or retrained using relevant data. In some implementations, the 2D object detection involves a neural network that may originally have been trained for object detection using data that may not be fully relevant to the object detection to be performed in the present subject matter. For example, the 2D object detection is finetuned and/or retrained based on camera images captured during vehicle travel. Image size and/or other hyperparameters regarding the 2D object detection can be adjusted.

At operation 440, a determination can be made whether the 2D object detection performs satisfactorily according to some standard. For example, precision and/or recall can be evaluated. If the performance is not satisfactory, finetuning and/or retraining can be performed in the operation 430.

If the performance is satisfactory in the operation 440, then in operation 450 an association component can be trained on relevant data. In some implementations, the association component is configured for pairing 2D and 3D bounding boxes with each other. For example, the neural network 116 can be trained.

In operation 460, a determination can be made whether the association component performs satisfactorily according to some standard. For example, precision and/or recall can be evaluated. If the performance is not satisfactory, training can be performed in the operation 450.

If the performance is satisfactory in the operation 460, then in operation 470 the 2D object detection and the association component can be jointly used to predict 2D bounding boxes. In some implementations, this is accomplished by executing one or more scripts. For example, automatic code inference can be performed.

Figure 5:
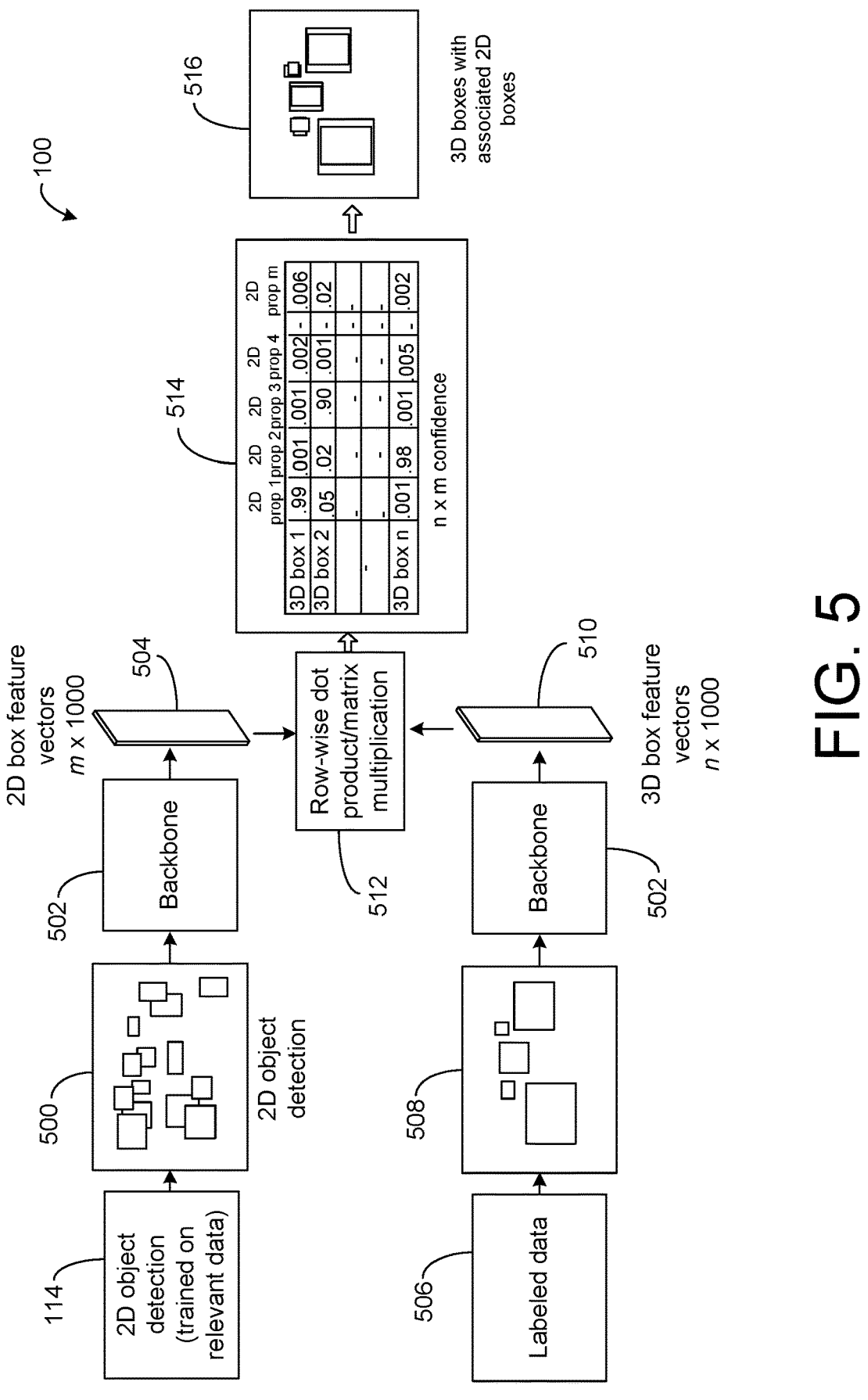
FIG. 5 shows additional examples regarding the system of FIG. 1.

FIG. 5 shows additional examples regarding the system 100 of FIG. 1. The 2D object detection component 114 trained on relevant data can generate output in form of a proposal 500 that includes 2D bounding boxes. The 2D bounding boxes of the proposal 500 can be processed via functionalities of a backbone network 502 to generate feature vectors 504. Each of the feature vectors 504 represents a particular place in the camera image subtended by one of the 2D bounding boxes. The feature vectors 504 can be generated by cropping the camera image to remove those portions of the image data 112 (FIG. 1) that are outside of the particular 2D bounding box. The feature vectors 504 can have any of multiple dimensionalities. In some implementations, each vector has 1000 coordinates, although larger or smaller numbers can be used. For example, m number of the feature vectors 504 can form an m×1000 matrix, where m is any number.

Labeled data 506 represents 3D data (e.g., obtained from LiDAR point cloud data). 3D bounding boxes 508 are obtained from, and are a representation of, the labeled data 506. In some implementations, the 3D object detection component 110 (FIG. 1) can be used. For example, a person viewing the 3D data can create the 3D bounding boxes 508. The 3D bounding boxes 508 can be processed via functionalities of the backbone network 502 to generate feature vectors 510. Each of the feature vectors 510 represents a particular place in the camera image indicated by one of the 3D bounding boxes 508. The feature vectors 510 can be generated by flattening one of the 3D bounding boxes 508 into its 2D projection, taking the 3D coordinates and thereafter using camera parameters, translation parameters, and/or reference frames to obtain the coordinates of pixel space implicated by the 3D bounding box 508. The camera image can then be cropped to remove those portions of the image data 112 (FIG. 1) that are outside of the indicated coordinates of pixel space. The feature vectors 510 can have any of multiple dimensionalities. In some implementations, each vector has 1000 coordinates, although larger or smaller numbers can be used. For example, n number of the feature vectors 510 can form an n×1000 matrix, where n is any number.

One or more mathematical operations 512 can be performed using the feature vectors 504 and 510. In some implementations, matrix multiplication is performed. For example, row-wise dot products can be calculated. An output 514 can result from the mathematical operations 512. In some implementations, the output 514 represents confidence levels of the association between the respective 2D bounding boxes and the 3D bounding boxes. For example, an n×m confidence matrix can indicate, for each of the 2D object detection proposals 500, the determined probability that the 2D bounding box identifies the same detected object as each one of the 3D bounding boxes. Any of multiple different ways of determining similarity between the feature vectors 504 and 510 can be used. In some implementations, a loss calculation is applied. The loss calculation can be based on mean squared error, root mean square error, mean absolute error, a quadratic loss function, an L1-type loss function, and/or a cosine similarity loss function.

Based on the output 514, training data 516 can be generated. The training data 516 can include 2D bounding boxes and 3D bounding boxes associated with each other. The training data can then be used in training a neural network of an ADAS to perform object detection and classification based on camera images.

Figure 6:
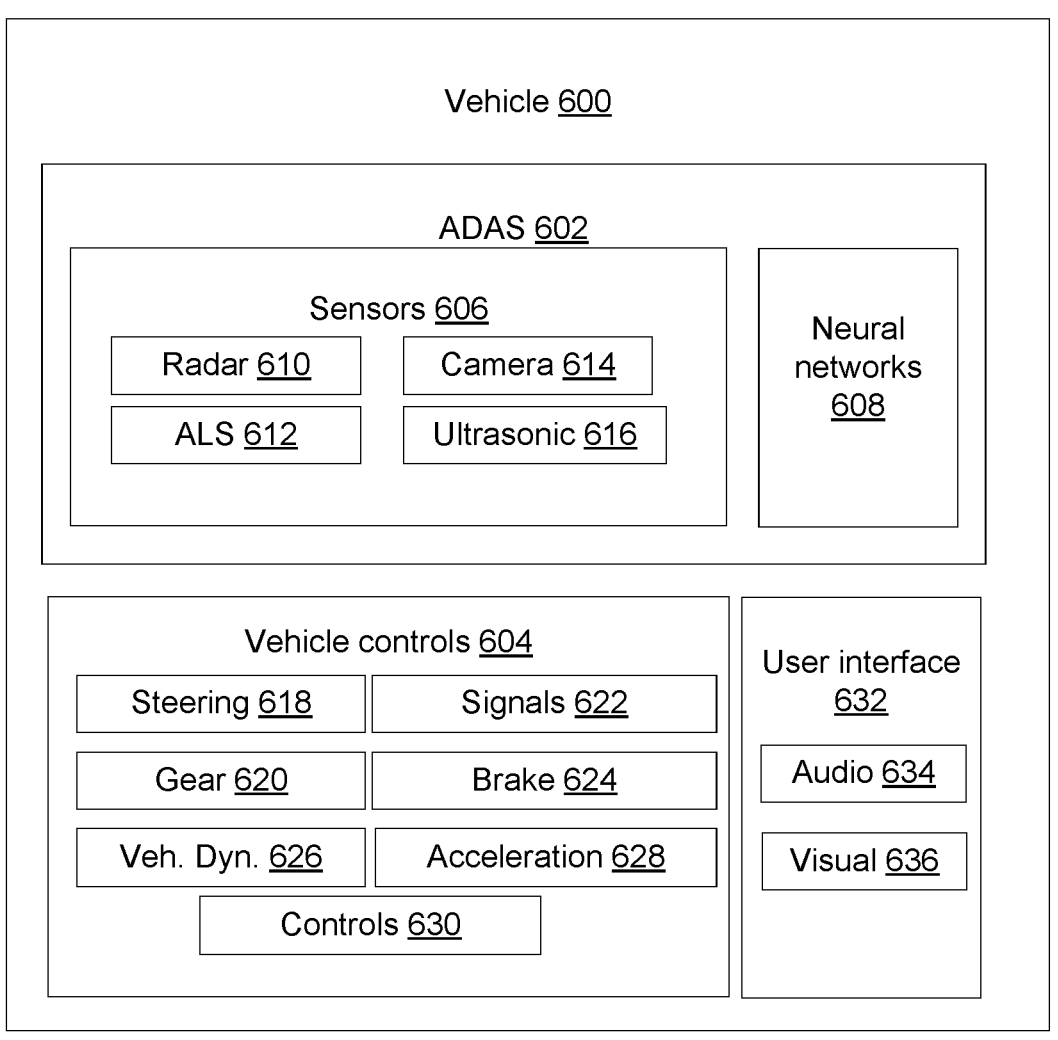
FIG. 6 shows an example of a vehicle.

FIG. 6 shows an example of a vehicle 600. The vehicle 600 can be used with one or more other examples described elsewhere herein. The vehicle 600 includes an ADAS 602 and vehicle controls 604. The ADAS 602 includes sensors 606 and a neural networks component 608. Other aspects that the vehicle 600 may include, including, but not limited to, other components of the vehicle 600 where the ADAS 602 may be implemented, are omitted here for simplicity.

The sensors 606 are here described as also including appropriate circuitry and/or executable programming for processing sensor output and performing a detection based on the processing. The sensors 606 can include a radar 610. In some implementations, the radar 610 can include any object detection system that is based at least in part on radio waves. For example, the radar 610 can be oriented in a forward direction relative to the vehicle and can be used for detecting at least a distance to one or more other objects (e.g., another vehicle). The radar 610 can detect the surroundings of the vehicle 600 by sensing the presence of an object in relation to the vehicle 600.

The sensors 606 can include a active light sensor (ALS) 612, including but not limited to, a LiDAR. In some implementations, the ALS 612 can include any object detection system that is based at least in part on laser light or LED light. For example, the ALS 612 can be oriented in any direction relative to the vehicle and can be used for detecting at least a distance to one or more other objects (e.g., another vehicle). The ALS 612 can detect the surroundings of the vehicle 600 by sensing the presence of an object in relation to the vehicle 600.

The sensors 606 can include one or more cameras 614. In some implementations, the cameras 614 can include any image sensor whose signal(s) the vehicle 600 takes into account. For example, the cameras 614 can be oriented in any of multiple directions relative to the vehicle and can be used for detecting vehicles or other objects, lanes, lane markings, curbs, and/or road signage.

The sensors 606 can include an ultrasonic sensor 616. In some implementations, the ultrasonic sensor 616 can include any transmitter, receiver, and/or transceiver used in detecting at least the proximity of an object based on ultrasound. For example, the ultrasonic sensor 616 can be positioned at or near an outer surface of the vehicle. The ultrasonic sensor 616 can detect the surroundings of the vehicle 600 by sensing the presence of an object in relation to the vehicle 600.

Any of the sensors 606 alone, or two or more of the sensors 606 collectively, can detect, whether or not the ADAS 602 is controlling motion of the vehicle 600, the surroundings of the vehicle 600. In some implementations, at least one of the sensors 606 can generate an output that is taken into account in providing a prompt to a driver, and/or in controlling motion of the vehicle 600. For example, the output of two or more sensors can be combined. In some implementations, one or more other types of sensors can additionally or instead be included in the sensors 606. The ADAS 602 can perform motion planning and/or plan a trajectory for the vehicle 600 based on the output(s) of one or more of the sensors 606.

The neural networks component 608 can include one or more neural networks models and definitions of thresholds. Each of the neural networks models can be trained based on the same or different training data than any other one of the neural networks models. Some of the neural networks models can be dedicated to one or more specific sensors.

The vehicle controls 604 can include a steering control 618. In some implementations, the ADAS 602 and/or another driver of the vehicle 600 controls the trajectory of the vehicle 600 by adjusting a steering angle of at least one wheel by way of manipulating the steering control 618. The steering control 618 can be configured for controlling the steering angle though a mechanical connection between the steering control 618 and the adjustable wheel, or can be part of a steer-by-wire system.

The vehicle controls 604 can include a gear control 620. In some implementations, the ADAS 602 and/or another driver of the vehicle 600 uses the gear control 620 to choose from among multiple operating modes of a vehicle (e.g., a Drive mode, a Neutral mode, or a Park mode). For example, the gear control 620 can be used to control an automatic transmission in the vehicle 600.

The vehicle controls 604 can include signal controls 622. In some implementations, the signal controls 622 can control one or more signals that the vehicle 600 can generate. For example, the signal controls 622 can control a turn signal and/or a horn of the vehicle 600.

The vehicle controls 604 can include brake controls 624. In some implementations, the brake controls 624 can control one or more types of braking systems designed to slow down the vehicle, stop the vehicle, and/or maintain the vehicle at a standstill when stopped. For example, the brake controls 624 can be actuated by the ADAS 602. As another example, the brake controls 624 can be actuated by the driver using a brake pedal.

The vehicle controls 604 can include a vehicle dynamic system 626. In some implementations, the vehicle dynamic system 626 can control one or more functions of the vehicle 600 in addition to, or in the absence of, or in lieu of, the driver's control. For example, when the vehicle comes to a stop on a hill, the vehicle dynamic system 626 can hold the vehicle at standstill if the driver does not activate the brake control 624 (e.g., step on the brake pedal).

The vehicle controls 604 can include an acceleration control 628. In some implementations, the acceleration control 628 can control one or more types of propulsion motor of the vehicle. For example, the acceleration control 628 can control the electric motor(s) and/or the internal-combustion motor(s) of the vehicle 600.

The vehicle controls 604 can include one or more other controls 630 that relate to at least one other aspect of the vehicle 600.

The vehicle 600 can include a user interface 632. The user interface 632 can include an audio interface 634. In some implementations, the audio interface 634 can include one or more speakers positioned in the passenger compartment. For example, the audio interface 634 can at least in part operate together with an infotainment system in the vehicle.

The user interface 632 can include a visual interface 636. In some implementations, the visual interface 636 can include at least one display device in the passenger compartment of the vehicle 600. For example, the visual interface 636 can include a touchscreen device and/or an instrument cluster display.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations or examples have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
  receiving camera images and three dimensional (3D) data captured by a first vehicle during travel;
  obtaining, by providing the camera images to a two-dimensional (2D) object detection algorithm, 2D bounding boxes corresponding to first objects visible in the camera images;
  obtaining 3D bounding boxes corresponding to second objects in the 3D data;
  performing association of the 2D bounding boxes with corresponding ones of the 3D bounding boxes using a first neural network; and
  generating, using the camera images and the 2D bounding boxes associated with corresponding ones of the 3D bounding boxes, training data for training a second neural network to perform 2D and 3D object detection in an advanced driver assistance system (ADAS) for a second vehicle.

2. The computer-implemented method of claim 1, further comprising training the second neural network using the training data.

3. The computer-implemented method of claim 1, wherein the 3D data comprises point cloud data reflecting surroundings of the first vehicle during the travel.

4. The computer-implemented method of claim 3, wherein the point cloud data is received from a light detection and ranging (LiDAR) device of the first vehicle.

5. The computer-implemented method of claim 1, wherein the 2D bounding boxes include pixel coordinates regarding the first objects visible in the camera images.

6. The computer-implemented method of claim 1, wherein the 2D object detection algorithm is performed by a third neural network.

7. The computer-implemented method of claim 6, further comprising training the third neural network, before providing the camera images to the 2D object detection algorithm, the third neural network trained using previous camera images associated with previous 2D bounding boxes.

8. The computer-implemented method of claim 1, wherein the 3D bounding boxes include 3D coordinates and heading angles for the second objects in the 3D data.

9. The computer-implemented method of claim 1, wherein the 3D bounding boxes are generated by a person who identifies the second objects based on analyzing the 3D data.

10. The computer-implemented method of claim 1, wherein the 2D object detection algorithm also performs classification of the first objects visible in the camera images, and wherein the training data further includes classification information.

11. The computer-implemented method of claim 1, wherein the first neural network performs the association of the 2D bounding boxes with the 3D bounding boxes using a similarity measure.

12. The computer-implemented method of claim 11, wherein performing the association of the 2D bounding boxes with the 3D bounding boxes comprises:
  performing a first cropping of the camera images based on the 2D bounding boxes;
  performing a second cropping of the camera images based on the 3D bounding boxes; and
  evaluating the first and second croppings using the similarity measure.

13. The computer-implemented method of claim 12, wherein performing the second cropping comprises using a translation parameter between a camera and a light detection and ranging (LiDAR) device of the first vehicle.

14. The computer-implemented method of claim 11, wherein the first neural network uses a first feature vector that is based on the camera images, and a second feature vector that is a representation of the 3D data.

15. The computer-implemented method of claim 14, wherein the first neural network performs the association by determining a loss associated with the first and second vectors.

16. A computer system comprising:
  a two-dimensional (2D) object detection algorithm implemented using at least a first processor and a first memory, the 2D object detection configured to create 2D bounding boxes corresponding to first objects visible in a camera images captured by a first vehicle during travel; and
  a first neural network implemented using at least a second processor and a second memory, the first neural network configured to associate the 2D bounding boxes with corresponding ones of 3D bounding boxes corresponding to second objects in 3D data captured by the first vehicle during the travel, wherein the computer system generates, using the camera images and the 2D bounding boxes associated with corresponding ones of the 3D bounding boxes, training data for training a second neural network to perform 2D and 3D object detection in an advanced driver assistance system (ADAS) for a second vehicle.

17. The computer system of claim 16, further comprising a third neural network that is configured to perform the 2D object detection algorithm.

18. The computer system of claim 16, wherein the first neural network is configured to perform the association of the 2D bounding boxes with the 3D bounding boxes using a similarity measure.

19. The computer system of claim 18, wherein the first neural network is configured to perform the association using a first feature vector that is based on the camera images, and a second feature vector that is a representation of the 3D data.

20. A non-transitory computer readable medium storing instructions that when executed by at least one processor cause operations to be performed, the operations comprising:

receiving camera images and three dimensional (3D) data captured by a first vehicle during travel;

obtaining, by providing the camera images to a two-dimensional (2D) object detection algorithm, 2D bounding boxes corresponding to first objects visible in the camera images;

obtaining 3D bounding boxes corresponding to second objects in the 3D data;

performing association of the 2D bounding boxes with corresponding ones of the 3D bounding boxes using a first neural network; and generating, using the camera images and the 2D bounding boxes associated with corresponding ones of the 3D bounding boxes, training data for training a second neural network to perform 2D and 3D object detection in an advanced driver assistance system (ADAS) for a second vehicle.

* * * * *